United States Patent Office 3,043,834
Patented July 10, 1962

3,043,834
[3-OXO-20-HYDROXY - 1,4,17(20) - PREGNATRIEN-16-YLIDEN] ACETIC ACID LACTONE, AND INTERMEDIATES THEREFOR
Kikuo Igarashi, Osaka, Japan, assignor to Shionogi & Co., Ltd., Osaka, Japan
No Drawing. Filed Dec. 11, 1961, Ser. No. 158,529
Claims priority, application Japan Dec. 31, 1958
13 Claims. (Cl. 260—239.55)

The present invention relates to steroidal lactones and intermediates thereof, and more particularly to [3-oxo-20-hydroxy-1,4,17(20)-pregnatrien-16-yliden]-acetic acid lactone and intermediates thereof.

The [3-oxo - 20-hydroxy - 1,4,17(20)-pregnatrien - 16-yliden]-acetic acid lactone, according to the present invention, corresponds to the formula:

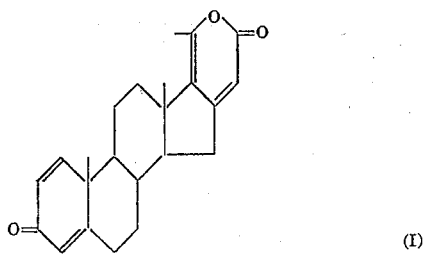

(I)

The Δ1,4-3-oxo steroidal lactone I is a form of synthetic adrenocortical hormone and can be produced from 5,6-dihydrokryptogenin diacylates, which are known and can be prepared from naturally existing kryptogenin, according to the method of the present invention.

Accordingly, a primary object of the present invention is to provide a utilization method for the said natural steroid. Another object of the present invention is to provide a synthetic method for the preparation of adrenocortical hormones. Another object of the invention is to provide the Δ1,4-3-oxo steroidal lactone, corresponding to Formula I, intermediates therefor and processes for their preparation.

The method of the present invention can be illustrated by the following scheme:

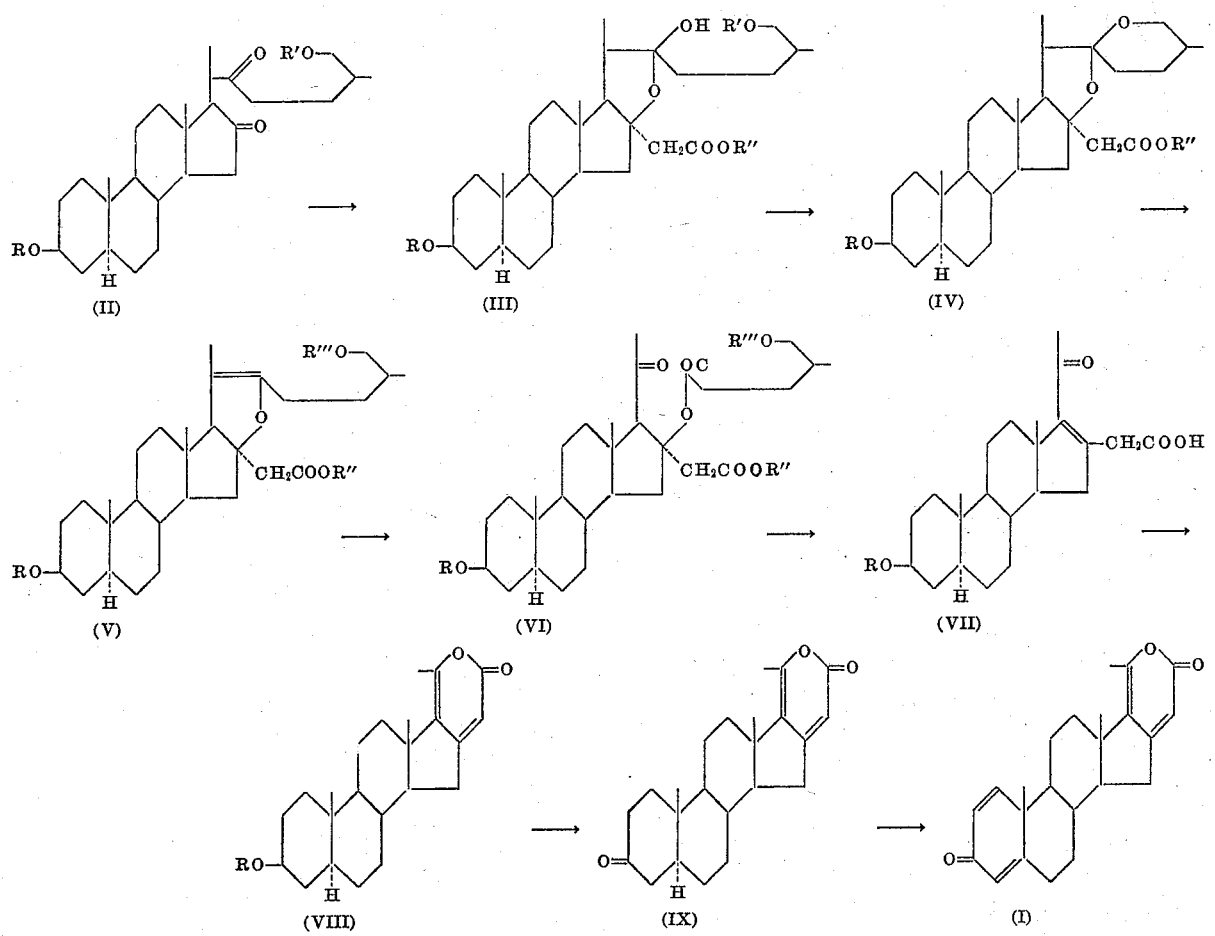

wherein each of R, R' and R''' represents hydrogen or a lower acyl group having from 1 to 10 carbon atoms such as formyl, acetyl, propionyl, butyryl, valeryl, octanoyl, decanoyl and the like, and R'' represents hydrogen or a lower alkyl group having from 1 to 10 carbon atoms such as methyl, ethyl, propyl, butyl, pentyl, octyl, decyl and the like. The scheme should be understood as showing the substantial conversion; the acyl radical, e.g. the 3-acyl radical, in some compounds shown therein may be changed to the hydroxyl radical, depending on the reagent used, in the course of reaction in some steps. However, the resulting hydroxyl compound can be easily changed into the corresponding acyl compound by a conventional esterification procedure.

Kryptogenin is known to occur in significant amounts in several species of Mexican Discorea, and it can be easily changed through kryptogenin diacylate (R.E. Marker et al.: J.A.C.S., 69, 2198 (1947)) into 5,6-dihydrokryptogenin diacylate (H. Hirschmann et al.: Tetrahedron, 3, 251 (1958)).

In the present invention, 5,6-dihydrokryptogenin diacylate, corresponding to Formula II, is used as the starting material. Firstly, it is subjected to addition with haloacetic ester and zinc, followed by hydrolysis with acid. The addition reaction is conveniently carried out by heating the 5,6-dihydrokryptogenin diacylate II with haloacetic ester and zinc in a solvent, preferably in the presence of a catalyst. As the haloacetic ester, there may for example be employed chloroacetic ester such as methyl chloroacetate, ethyl chloroacetate or propyl chloroacetate, bromoacetic ester such as methyl bromoacetate, ethyl bromoacetate, propyl bromoacetate or butyl bromoacetate, or iodoacetic ester such as methyl iodoacetate, ethyl iodoacetate or propyl iodoacetate. Although any one of these illustratively disclosed haloacetic esters can be used, a bromoacetic ester is actually preferred. It is also preferred that the zinc be pure and that it have a fresh, clean surface. Zinc dust, zinc foil, granulated zinc and mossy zinc may equally well be used, but any of the forms of zinc employed should be purified by washing with a solvent. Usually, the zinc is used in the reaction after washing it with dilute acid, water, alcohol and acetone in turn and drying in vacuo. As the solvent, in which the reaction is carried out, there may be used benzene, toluene, xylene or the like. Although the use of a catalyst is not always necessary, it may be helpful in initiating the reaction to use a few crystals of iodine, a little amalgamated zinc or a little alkylmagnesium iodide, when difficulty is encountered. The intermediarily-formed addition complex, corresponding to the following formula:

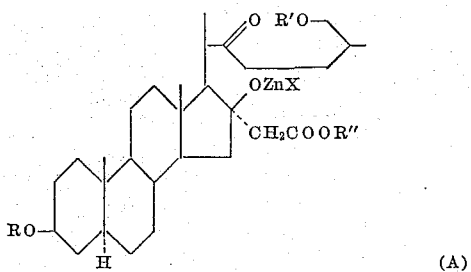

(A)

wherein R, R' and R'' have the hereinbefore-stated meanings and X is halogen such as chlorine, bromine or iodine is treated with a dilute acid such as dilute hydrochloric acid or dilute sulfuric acid at room temperature (15 to 30° C.) or while ice-cooling to yield a cyclic ether compound, corresponding to Formula III.

Secondly, the thus-obtained cyclic ether Compound III is subjected to cyclization by treatment with alkali, followed with acidifying. The reaction can conveniently be carried out by allowing the cyclic ether III to stand at room temperature, or by heating the cyclic ether Compound III, with an alkali such as sodium hydroxide, potassium hydroxide, sodium carbonate, sodium bicarbonate, potassium carbonate, potassium bicarbonate and the like, and then treating the reaction product with a mineral acid such as hydrochloric acid, sulfuric acid and the like.

Thirdly, the resulting spirostane, corresponding to Formula IV, is subjected to pseudomerization (conversion into the pseudo form). The pseudomerization reaction may be carried out by treating the spirostane IV under conditions providing an acylonium ion, i.e. by heating the said spirostane IV with an acid anhydride in the presence of pyridine hydrochloride or a Lewis acid as a catalyst. As the Lewis acid, there may for example be employed hydrochloric acid, acetyl chloride, aluminum chloride, p-toluenesulfonyl chloride, zinc acetate or trichloroacetic acid. Generally, it is preferred to execute the reaction in the presence of pyridine hydrochloride.

Fourthly, the resulting pseudo form compound, corresponding to Formula V, is subjected to oxidation with an oxidizing agent. As the oxidation agent, there may advantageously be used chromic acid-acetic acid, hydrogen peroxide-acetic acid, potassium permanganate-acetic acid, ozone and the like. The reaction conditions for the oxidation may be selected accordingly to the general knowledge in the use of these oxidizing agents.

Fifthly, the thus-obtained pregnane compound of Formula VI is subjected to elimination of the substituent at the 16-position. The reaction can be carried out by the treatment of the pregnane Compound VI with alkali. The reaction may proceed in two steps, i.e. hydrolysis at 16-position and dehydration between the 16- and 17-positions, to yield the 16-pregnene of Formula VII. Sometimes, the laconization reaction follows immediately to give the 3-hydroxylor acyloxy steroidal lactone of Formula VIII. Whether or not this takes place depends on the reaction conditions, e.g. alkali employed. For instance, the treatment of the pregnane Compound VI with alkali metal hydroxide for a short time gives the 16-pregnene VII, while treatment with alkali metal bicarbonate in lower alkanol gives the 3-hydroxyl or acyloxy steroidal lactone VIII. Generally speaking, the said lactonization reaction may take place when the alkalinity is relatively strong. The conversion of the 16-pregnene VII into the 3-hydroxyl or acyloxy steroidal lactone VIII can be easily accomplished by treatment with an acid such as hydrochloric acid, sulfuric acid or acetic acid or also with an acid anhydride, e.g. in the presence of pyridine.

Sixthly, the thus-obtained 3-hydroxyl or acyloxy steroidal lactone VIII is subjected to oxidation of the hydroxyl radical at the 3-position to the oxo radical, if the substituent at the 3-position is an acyloxy radical, with the previous conversion of the acyloxy radical into the hydroxyl radical. The previous conversion can be easily executed according to a conventional hydrolyzing procedure, e.g. treating with acid. The oxidation reaction may be carried out by treating the 3-hydroxyl steroidal lactone VIII with an oxidizing agent. As the oxidizing agent, there may be advantageously used aluminum trialkoxide and ketone or chromic acid. In the former case, the reaction may be carried out by refluxing the 3-hydroxyl steroidal lactone VIII with aluminum trialkoxide, such as aluminum triisopropoxide, aluminum triisobutoxide or aluminum tri-t-butoxide, and ketone, such as acetone, methyl ethyl ketone or cyclohexanone, preferably in an inert organic solvent such as benzene, toluene or xylene. In the latter case, the reaction may be carried out by treating the 3-hydroxyl steroidal lactone VIII with chromic acid or chromic acid-sulfuric acid in an inert solvent such as acetone or glacial acetic acid at a lower temperature.

Seventhly, the resulting 3-oxo steroidal lactone, corresponding to Formula IX, is subjected to dehydrogenation. The reaction may be carried out by refluxing the 3-oxo steroidal lactone IX with selenium dioxide in an inert solvent such as dioxane, acetic acid, benzene, methanol, ethanol or butanol. As the result of the reaction, the objective $\Delta^{1,4}$-3-oxo steroidal lactone I is obtained as a mixture with the diselenide compound, corresponding to the following formula:

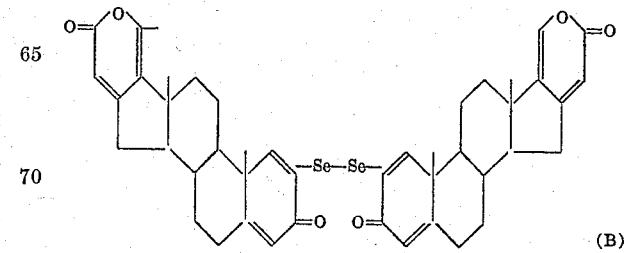

(B)

The $\Delta^{1,4}$-3-oxo steroidal lactone I can be easily separated from the said reaction mixture according to the conventional purification procedure, e.g. fractional recrystallization or chromatography.

Although the method of the present invention is hereinbefore illustrated step by step, these steps may be executed successively without the isolation of the product in each step.

The final product of the present invention [3-oxo-20-hydroxy-1,4,17(20) - pregnatrien - 16-yliden]-acetic acid lactone of Formula I, is a form of synthetic adrenocortical hormone, and has physiological activities. When the $\Delta^{1,4}$-3-oxo steroidal lactone I is administered together with desoxycorticosterone (DOCA) to the adrenoprival mouse, regulation of sodium and potassium metabolism is not affected, but water retention is selectively increased. The $\Delta^{1,4}$-3-oxo steroidal lactone I is useful for the particular treatment of adrenal cortical insufficiency, and from the fact mentioned above it appears that some effective anti-desoxycorticosterone agents may exist in the group of analogous compounds. In fact [3β,20-dihydroxy-5α-17(20)-pregnen-16-yliden]-acetic acid lactone of Formula VIII controls the activity of desoxycorticosterone completely, when administered together with desoxycorticosterone in the amount of 500 times of the latter.

Thus, the process involved in the present invention has significant utility with respect to the synthesis of physiologically active steroids, and the thus-obtained products are also useful adrenocortical hormones or intermediates.

The following examples represent presently-preferred embodiments of the present invention, but it is to be understood that the examples are given by way of illustration only and not of limitation. The abbreviations used in these examples are intended to have the following means: g., gram; mg., milligram; ml., milliliters; ° C., degrees centigrade; and M.P., melting point.

*Example 1*

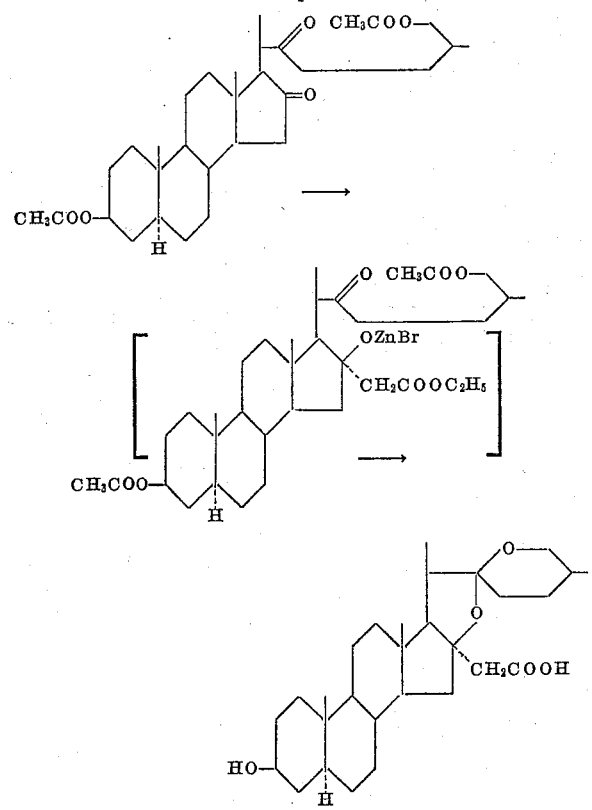

10 g. of 5,6-dihydrokryptogenin 3,26-diacetate are dissolved in 60 ml. of dry toluene and 40 ml. of dry benzene, and 4 g. of granulated zinc are added. Then the mixture is boiled in an oil bath to eliminate moisture, and cooled. To the mixture, 10 g. of ethyl bromoacetate and a few crystals of iodine are added, and the whole heated mildly with stirring until reaction starts. As soon as reaction sets in, the oil bath is removed and the mixture is cooled with water so that the reaction proceeds mildly. After refluxing mildly for 1 hour more, the mixture is poured into dilute sulfuric acid with ice-cooling to hydrolyze the addition complex. The organic layer is separated and the aqueous layer is extracted with two 100 ml. portions of chloroform. The extracts are combined with the previously separated organic layer, washed with dilute sodium carbonate solution and water, dried over sodium sulfate, and the solvent removed under reduced pressure. The residue is dissolved in 300 ml. of methanol, and 30 g. of 20% potassium bicarbonate solution are added, and the solution refluxed for 5 hours in an oil bath. After removing the methanol under reduced pressure, water is added to the residue and the resultant precipitates are collected by filtration, washed with water and chloroform thoroughly, and the filtrate extracted with chloroform. The aqueous layer is combined with the previously obtained precipitates, and acidification effected with dilute hydrochloric acid. The thus-precipitated crystals are collected by filtration, washed with water and dried. Recrystallizing from methanol, there are obtained 4.6 g. of 3β-hydroxy - 5α,22β - spirostan-16α-acetic acid (tigogenin-16α-acetic acid), M.P. 254 to 255° C. (dec.). $[\alpha]_D^{32}$—52.6 (±4°) (in dioxane), I.R. $\nu_{max}^{Nujol}$ 3520, 984, 902, 888, 865 cm.$^{-1}$ (888 cm.$^{-1}$ > 902 cm.$^{-1}$)

*Analysis.*—Calcd. for $C_{29}H_{46}O_6$: C, 73.38; H, 9.77. Found: C, 73.10; H, 9.73.

In conventional manner, the following compounds are obtained from the above product:

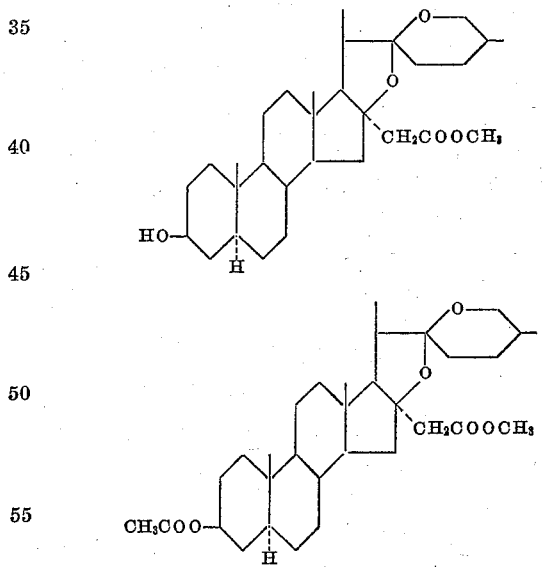

Methyl 3β-hydroxy-5α,22β-spirostan-16α-acetate: M.P. 194 to 195° C. $[\alpha]_D^{29}$ —44.9° (±2°) (in chloroform).

Methyl 3β-acetoxy-5α,22β-spirostan-16α-acetate: M.P. 167 to 168° C. $[\alpha]_D^{29}$ —63.2° (±2°) (in chloroform).

*Example 2*

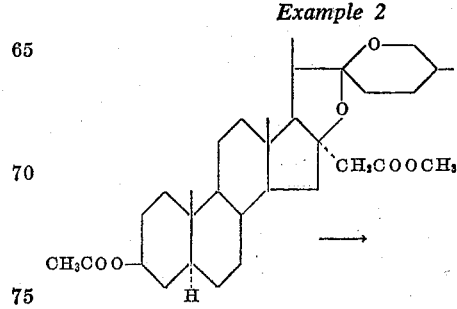

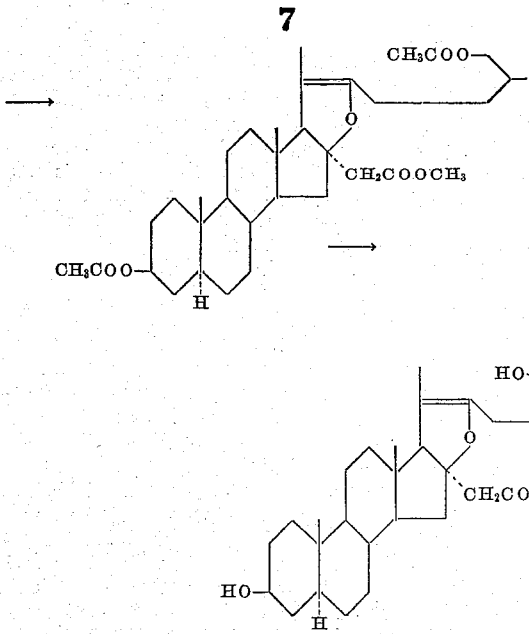

To 50 ml. of acetic anhydride, 5 g. of methyl 3β-acetoxy-5α,22β-spirostan-16α-acetate and 2.2 g. of pyridine hydrochloride are added and the mixture heated with refluxing on an oil bath for 5 hours. After concentration under reduced pressure, the reaction mixture is extracted with ether. The extract is washed successively with water, sodium bicarbonate and water and dried over sodium sulfate. Removal of ether yields crude crystals of methyl 3β,26-diacetoxy-5α-20(22)-furosten-16α-acetate.

The so-obtained crystals are hydrolyzed with potassium hydroxide in methanol and the resulting product is recrystallized from ethyl acetate-methanol to give 3β,26-dihydroxy-5α-20(22)-furosten-16α-acetic acid as crystals melting at 201 to 202° C. (dec.). Yield 85%. I.R. ν max 3290(OH), 2685–2715(COOH), 1700 (vinyl ether) cm.⁻¹.

*Analysis.*—Calcd. for $C_{29}H_{46}O_5$: C, 73.38; H, 9.77. Found: C, 73.34; H, 9.70.

*Example 3*

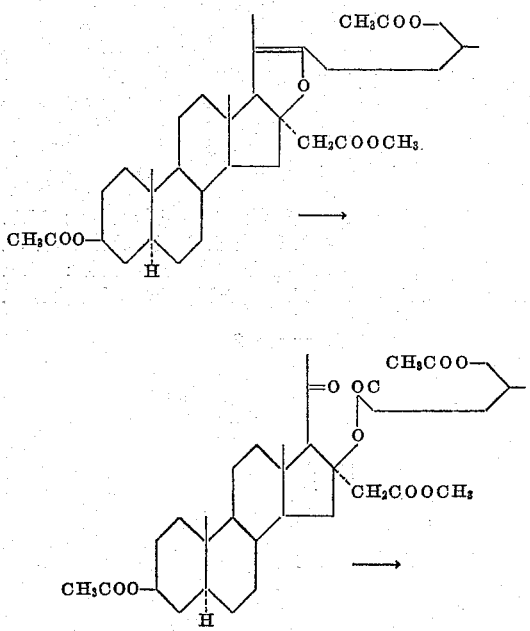

1.032 g. of crude methyl 3β,26-diacetoxy-5α-20(22)-furosten-16α-acetate are dissolved in 10 ml. of glacial acetic acid. To the solution, 9.1 ml. of a solution of N chromic acid in 90% acetic acid are added under ice-cooling, and the whole allowed to stand for 15 hours. Then 4 ml. of methanol are added to the reaction mixture to decompose excess of chromic acid, and the mixture extracted with ether. The extract is washed with water, the solvent removed and the residue treated with ether-petroleum ether. The crystallized substances (being a by-product) is removed and the mother liquor is heated with 50 ml. of methanol, 2 ml. of water and 1.5 g. of potassium bicarbonate while refluxing for 40 minutes. After cooling, the resulting mixture is extracted with chloroform and the extract is washed with water. Evaporation to dryness gives 610 mg. of residue. The residue is dissolved in benzene and is then chromatographed on 4 g. of Florisil (activated magnesium silicate) to yield 474 mg. of crude crystals. The crude crystals are recrystallized from acetone-petroleum ether to give [3β,20 - dihydroxy - 5α - 17(20) - pregnen - 16 - yliden] - acetic acid lactone as crystals melting at 198 to 199° C.

I.R. $\nu_{max}^{Nujol}$ 3560, 3520, 3280, (OH), 1727, 1710 (CO), 1654, 1587, (double bond) cm.⁻¹. U.V. $\lambda_{max}^{95\% \text{ ethanol}}$ 300 mμ (ε:6740).

*Analysis.*—Calcd. for $C_{23}H_{32}O_3$: C, 77.49; H, 8.77. Found: C, 77.61; H, 8.97.

The so-obtained compound is acetylated with acetic anhydride and pyridine and the resulting product is recrystallized from methanol to give [3β-acetoxy-20-hydroxy-5α-17(20)-pregnen-16-yliden]-acetic acid lactone as crystals melting at 215–217° C.

I.R. $\nu_{max}^{Nujol}$ 1741, 1725, 1678, 1593, cm.⁻¹, U.V. $\lambda_{max}^{95\% \text{ ethanol}}$ 301 mμ (ε:6700).

*Analysis.*—Calcd. for $C_{25}H_{34}O_4$: C, 75.34; H, 8.60. Found: C, 75.44; H, 8.57.

*Example 4*

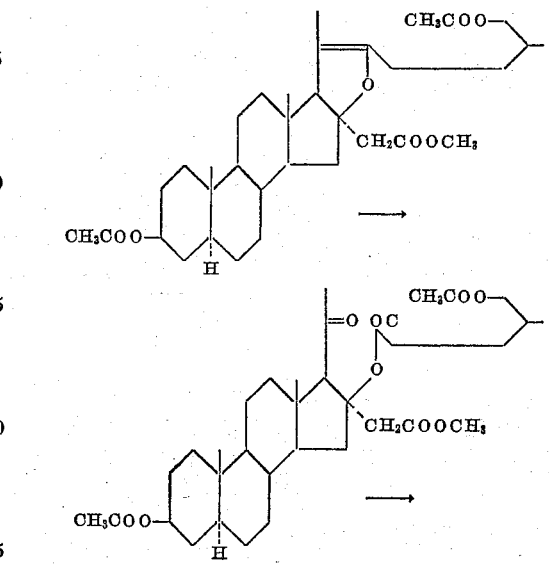

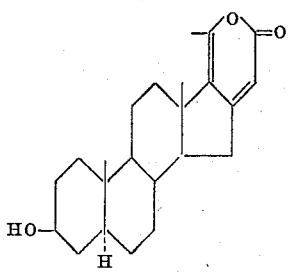

To a solution of 1.014 g. of methyl 3β,26-diacetoxy-5α-20(22)-furosten-16α-acetate in 10 ml. of glacial acetic acid are added 10 ml. of glacial acetic acid and 10 ml. of 35% hydrogen peroxide. The mixture is allowed to stand at 20° C. for 6 hours, and then subjected to the treatment for decarboxylation as described in Example 3 to give 383 mg. of [3β,20-dihydroxy-5α-17(20)-pregnen-16-yliden]-acetic acid lactone.

*Example 5*

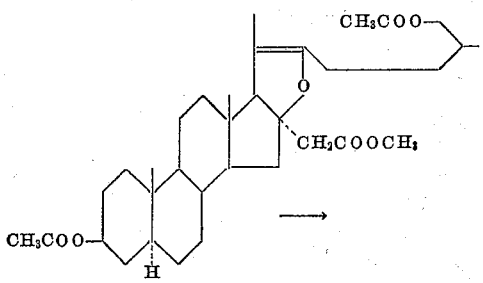

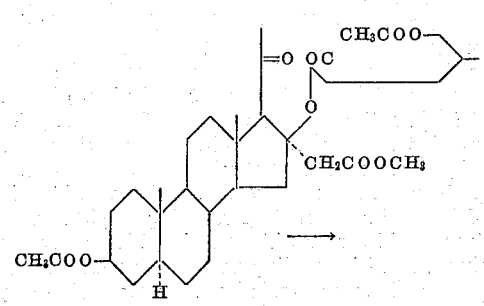

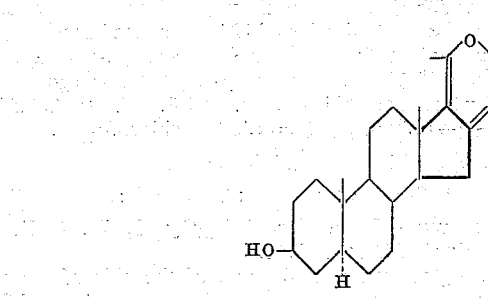

To a solution of 1.031 g. of methyl 3β,26-diacetoxy-5α-20(22)-furosten-16α-acetate in 45 ml. of glacial acetic acid is added a solution of 467 mg. of potassium permanganate in 33 ml. of 60% acetic acid with stirring while ice-cooling. Then the reaction mixture is allowed to stand at 20° C. for 5 hours and subjected to the treatment for decarboxylation as described in Example 3 to give 293 mg. of [3β,20-dihydroxy-5α-17(20)-pregnen-16-yliden]-acetic acid lactone.

*Example 6*

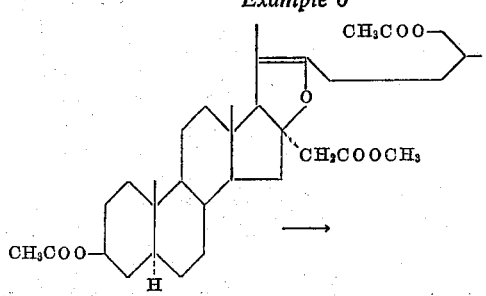

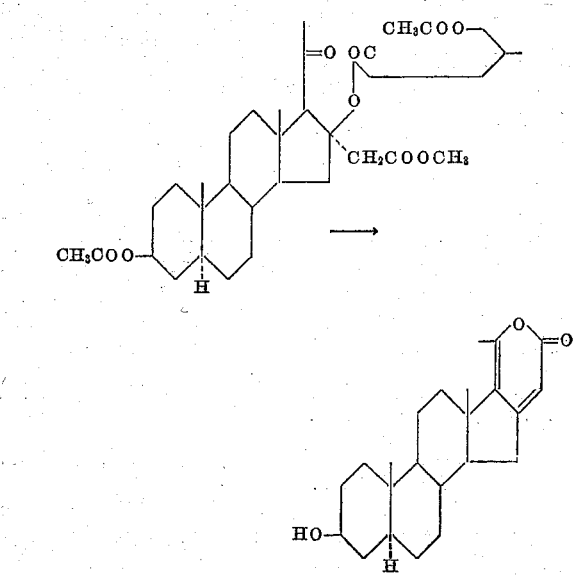

Into 1 g. of methyl 3β,26-diacetoxy-5α-20(22)-furosten-16α-acetate in 15 ml. of chloroform, ozone is introduced while cooling with Dry Ice-acetone. The mixture begins to show a pale blue color within 1.5 hours. The chloroform is then removed at a lower temperature. The residue is dissolved in 15 ml. of glacial acetic acid, 1.3 g. of zinc powder added while cooling, and the whole allowed to stand with occasional stirring. After the reaction mixture becomes negative in iodo-zinc-starch paper, water is added and the treatment as described in Example 3 for decarboxylation carried out to give 362 mg. of [3β,20-dihydroxy-5α-17(20)-pregnen-16-yliden]-acetic acid lactone.

*Example 7*

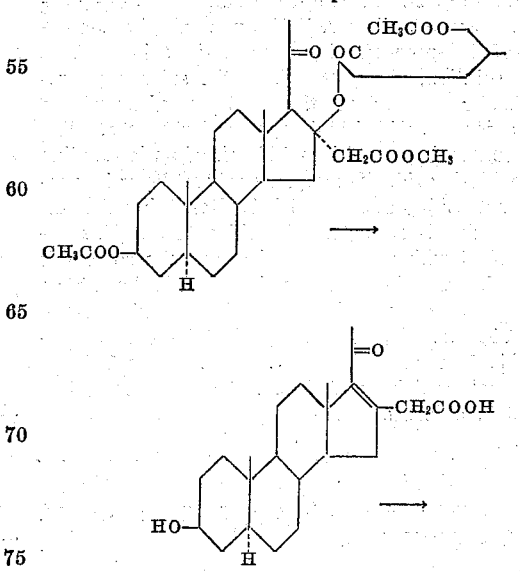

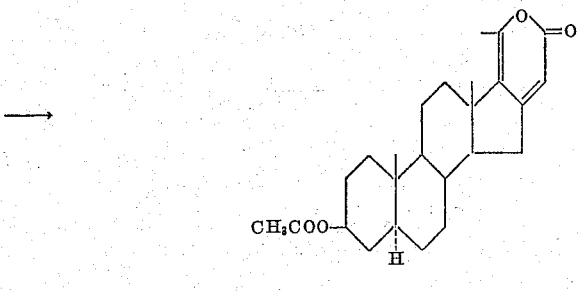

In 25 ml. of methanol, there are dissolved 1.903 g. of the oxidation product obtained as an intermediate in Example 3. To the resultant solution are added 2 g. of potassium hydroxide, 5 ml. of water and 10 ml. of methanol, and the whole heated with refluxing for 3 minutes. The reaction mixture is diluted with water, and then dilute hydrochloric acid is added to acidity. The resultant crystalline substance is collected by filtration, washed with water, dried and treated with acetone. The acetone-extract is chromatographed on 20 g. of silica gel. The eluates with chloroform-acetone (95:5–90:10) are crystallized from acetone to give 228 mg. of 3β-hydroxy-20-oxo-5α-16(17)-pregnen-16-acetic acid. M.P. 173 to 174° C. (recrystallized from dichloromethane-acetone).

I.R. $\nu_{max.}^{Nujol}$ 3440, 3206, 1729, 1687, 1660, 1644, 1611 cm.$^{-1}$.
U.V. $\lambda_{max.}^{95\% \text{ ethanol}}$ 253 mμ (ε:7560).

*Analysis.*—Calcd. for $C_{23}H_{34}O_4$: C, 73.57; H, 9.15. Found: C, 73.76; H, 9.15.

The so-obtained compound is acetylated with acetic anhydride and pyridine to give [3β-acetoxy-20-hydroxy-5α-17(20)-pregnen-16-yliden]-acetic acid lactone.

Example 8

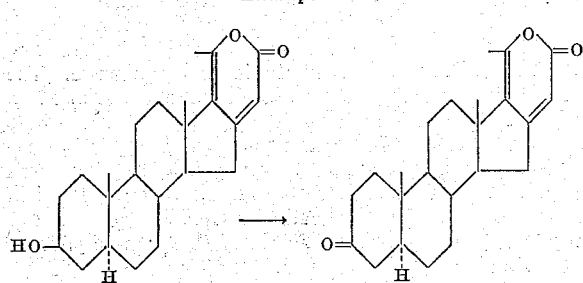

In a mixture of 20 ml. of toluene and 10 ml. of cyclohexanone, there are dissolved 488 mg. of [3β,20-dihydroxy-5α-17(20)-pregnen-16-yliden]-acetic acid lactone. From the solution, about 10 ml. of the solvent are removed. To the resulting solution, 400 mg. of aluminum triisopropoxide are added and refluxed for 1 hour. The reaction mixture is poured into 100 ml. of an ice-cooling 2% hydrochloric acid. The organic solvent layer is separated, washed with water and dried. Removing the solvent, the residue is extracted with chloroform. The extract is washed with water and dried, and the solvent is removed. The resulting substance is crystallized out from ether-petroleum ether and recrystallized from acetone to afford 230 mg. of [3-oxo-20-hydroxy-5α-17(20)-pregnen-16-yliden]-acetic acid lactone. M.P. 242 to 245° C. (gradually coloured from 225° C.). $[\alpha]_D^{22}$—0.9°(±2°) (c.=0.990 in chloroform).

I.R. $\nu_{max.}^{Nujol}$ 1728, 1713, 1695, 1659, 1584 cm.$^{-1}$. U.V. $\lambda_{max.}^{95\% \text{ ethanol}}$ 301 mμ (ε:6730).

*Analysis.*—Calcd. for $C_{23}H_{30}O_3$: C, 77.92; H, 8.53. Found: C, 77.60; H, 8.65.

Example 9

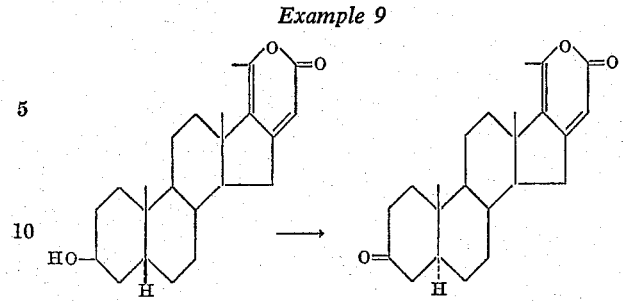

A solution of 26.72 g. of chromic acid in 23 ml. of conc. sulfuric acid is diluted with water to make 100 ml. To a solution of 475 mg. of [3β,20-dihydroxy-5α-17(20)-pregnen-16-yliden]-acetic acid lactone in 50 ml. of acetone, 0.46 ml. of the said chromic acid-sulfuric acid solution is added with stirring, and the further stirring is continued for 5 minutes. The reaction mixture is poured into 300 ml. of water and then extracted with chloroform. The extract is washed with water and dried. Removing the solvent, the residue is recrystallized from acetone to afford 286 mg. of [3-oxo-20-hydroxy-5α-17(20)-pregnen-16-yliden]-acetic acid lactone as crystals melting at 242 to 245° C.

Example 10

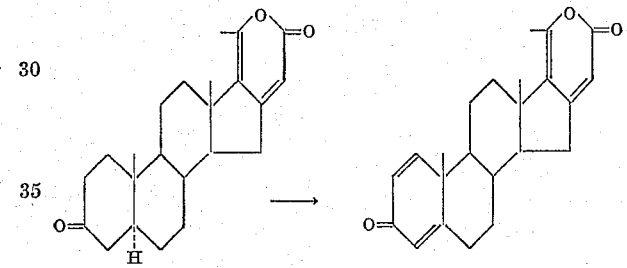

To a solution of 300 mg. of [3-oxo-20-hydroxy-5α-17(20)-pregnen-16-yliden]-acetic acid lactone in 15 ml. of t-butanol and 0.15 ml. of acetic acid, 180 mg. of selenium dioxide are added. After refluxing the resultant solution for 24 hours, 180 mg. of selenium dioxide are added again and refluxed for further 24 hours. Cooling the reaction mixture, the precipitated selenium is separated by filtration and washed with ethyl acetate. The filtrate is concentrated in vacuo, and the residue is dissolved in ethyl acetate. The resulting ethyl acetate solution is washed in order with potassium bicarbonate, water, freshly prepared ice-cooling ammonium hydrogen sulfide, ice-cooling dilute ammonia water, water, dilute hydrochloric acid and water, and dried. Removing the solvent, the residue (285 mg.) is chromatographed on 8 g. of alumina. Recrystallization of 124 mg. of the benzene-chloroform (9:1 to 6:4) eluates from acetone-hexane affords 54 mg. of [3-oxo-20-hydroxy-1,4,17(20)-pregnatrien-16-yliden]-acetice acid lactone. M.P. 265 to 267.5° C., $[\alpha]_D^{22}$—16.2(±2°) (c.=1.016% chloroform).

I.R. $\nu_{max.}^{Nujol}$ 1730, 1712, 1662, 1619, 1605, 1586 cm$^{-1}$. U.V $\lambda_{max.}^{95\% \text{ ethanol}}$ 243 mμ (ε:17000); 301 mμ (ε:7000)

*Analysis.*—Calcd. for $C_{23}H_{26}O_3$: C, 78.82; H, 7.48. Found: C, 78.71; H, 7.48.

Recrystallization of 70 mg. of the chloroform eluate from acetone-hexane affords 20 mg. of diseleno-2,2'-bis-[(3 - oxo - 20-hydroxy-1,4,17(20)-pregnatrien-16-yliden)-acetic acid lactone]. M.P. 306° C. (decomposition). $[\alpha]_D^{22}$—323.0°(±5°) (c.=0.651 chloroform).

I.R. $\nu_{max.}^{Nujol}$ 3300—3580 (OH), 1728, 1710, 1695, 1641, 1620, 1586 cm.$^{-1}$. U.V. $\lambda_{max.}^{95\% \text{ ethanol}}$ 246, mμ (ε:11000); 260 mμ (ε:11100); 301 mμ (ε:6900).

*Analysis.*—Calcd. for $C_{46}H_{50}O_6Se_2 \cdot 3H_2O$: C, 60.67; H, 6.17. Found C, 60.84; H, 6.18.

While the foregoing examples are directed to simplest and presently preferred specific embodiments, more complex embodiments wherein the moieties corresponding to R', R" and R'" contain up to 10 carbon atoms may mutatis mutandis be similarly prepared and used.

This application is a continuation-in-part of copending application, Serial No. 861,212, filed December 22, 1959 (abandoned since the filing of the present application).

What is claimed is:

1. [3-oxo - 20 - hydroxy - 1,4,17(20) - pregnatrien - 16-yliden]-acetic acid lactone.

2. [3-oxo-20-hydroxy-5α-17(20)-pregnen - 16 - yliden]-acetic acid lactone.

3. A compound of the formula

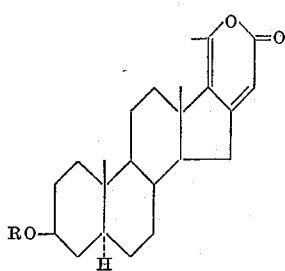

wherein R is a member selected from the group consisting of H and alkylcarbonyl, the alkyl moiety of the latter containing from 1 to 10 carbon atoms.

4. [3β,20-dihydroxy-5α-17(20) - pregnen - 16 - yliden]-acetic acid lactone.

5. [3β-alkylcarbonyloxy-20-hydroxy - 5α - 17(20)-pregnen-16-yliden]-acetic acid lactone, wherein the alkyl moiety contains from 1 to 10 carbon atoms.

6. [3β-acetoxy-20-hydroxy - 5α - 17(20) - pregnen-16-yliden]-acetic acid lactone.

7. 3β-hydroxy-5α,22β-spirostan-16α-acetic acid.

8. Methyl 3β-hydroxy-5α,22β-spirostan-16α-acetate.

9. Methyl 3β-alkylcarbonyloxy - 5α,22β - spirostan-16α-acetate, wherein the alkyl moiety contains from 1 to 10 carbon atoms.

10. Methyl 3β-acetoxy-5α,22β-spirostan-16α-acetate.

11. 3β,26-dihydroxy-5α-20(22) - furosten - 16α - acetic acid.

12. Methyl 3β,26-diacetoxy-5α-20(22) - furosten - 16α-acetate.

13. 3β-hydroxy-20-oxo-5α-16(17)-pregnen - 16 - acetic acid.

References Cited in the file of this patent

Noller: Chemistry of Organic Compounds, 2nd ed., 1957, W. B. Saunders Co., Philadelphia, Pa., p. 236.